US012609475B2

(12) United States Patent
Uchida et al.

(10) Patent No.: US 12,609,475 B2
(45) Date of Patent: Apr. 21, 2026

(54) ELECTRICAL CONNECTOR

(71) Applicant: Mitsubishi Electric Corporation, Tokyo (JP)

(72) Inventors: Takeshi Uchida, Tokyo (JP); Yuzo Tamaki, Tokyo (JP); Tetsu Owada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 278 days.

(21) Appl. No.: 18/378,816

(22) Filed: Oct. 11, 2023

(65) Prior Publication Data

US 2024/0039200 A1 Feb. 1, 2024

Related U.S. Application Data

(63) Continuation of application No. PCT/JP2021/017989, filed on May 12, 2021.

(51) Int. Cl.
*H01R 13/426* (2006.01)
*H01R 13/502* (2006.01)

(52) U.S. Cl.
CPC ....... *H01R 13/426* (2013.01); *H01R 13/5025* (2013.01)

(58) Field of Classification Search
CPC .............. H01R 13/426; H01R 13/5025; H01R 13/6596; H01R 12/722; H01R 13/6592; H01R 24/54; H01R 24/40; H01R 31/06
See application file for complete search history.

(56) References Cited

U.S. PATENT DOCUMENTS

| | | | | |
|---|---|---|---|---|
| 9,660,355 | B2 * | 5/2017 | Kato | H01R 13/6591 |
| 10,992,087 | B2 * | 4/2021 | Hoyack | H01R 9/0509 |
| 2014/0148052 | A1 | 5/2014 | Hall et al. | |
| 2019/0006795 | A1 | 1/2019 | Kondo et al. | |

FOREIGN PATENT DOCUMENTS

| | | | | | |
|---|---|---|---|---|---|
| DE | 102007052606 | B3 * | 6/2009 | H01R 13/74 |
| JP | 2-62679 | A | 3/1990 | |
| JP | 2002-216910 | A | 8/2002 | |

(Continued)

OTHER PUBLICATIONS

International Search Report (PCT/ISA/210) issued in PCT/JP2021/017989, dated Jul. 13, 2021.

(Continued)

*Primary Examiner* — Travis S Chambers
(74) *Attorney, Agent, or Firm* — Birch, Stewart, Kolasch & Birch, LLP

(57) ABSTRACT

An electrical connector includes an inner conductor to transmit a signal; an insulator that covers an outer circumferential surface of the inner conductor; an outer conductor that covers an outer circumferential surface of the insulator and is insulated from the inner conductor by the insulator; an insulating mold that covers an outer circumferential surface of the outer conductor; and a conductor that is conductively connected with the outer conductor and penetrates the insulating molded, the conductor having a surface that is positioned outside the insulating mold and inclined toward a connection destination, and the outer conductor and the conductor are integrally formed.

2 Claims, 9 Drawing Sheets

(56) References Cited

FOREIGN PATENT DOCUMENTS

| | | | | |
|---|---|---|---|---|
| JP | 2007-42626 A | 2/2007 | | |
| JP | 2015-536554 A | 12/2015 | | |
| JP | 2019-12605 A | 1/2019 | | |
| JP | 2019-40833 A | 3/2019 | | |
| WO | WO-2023286578 A1 * | 1/2023 | ......... | H01R 13/6596 |

OTHER PUBLICATIONS

Notice of Reasons for Refusal in Japanese Patent Application No. 2022-502047, dated Apr. 5, 2022.
Notice of Reasons for Refusal in Japanese Patent Application No. 2022-502047, dated Feb. 8, 2022.

* cited by examiner

ELECTRICAL CONNECTOR

CROSS REFERENCE TO RELATED APPLICATIONS

This application is a Continuation of PCT International Application No. PCT/JP2021/017989 filed on May 12, 2021, which is hereby expressly incorporated by reference into the present application.

TECHNICAL FIELD

The present disclosure relates to an electrical connector.

BACKGROUND ART

There have been shield cables in which the outer circumferential surface of an inner conductor, which transmits signals, is surrounded by an outer conductor in order to reduce electromagnetic noise emitted from the cables. In order for such a shield cable to exhibit the shield performance to interrupt electromagnetic noise, the outer conductor of the shield cable needs to be grounded to a metal housing storing electronic equipment or the like. In view of this, there has been a method in which, when the shield cable is connected to a circuit board stored in the metal housing, the outer conductor of the shield cable is grounded by causing the outer circumference of a connector conductively connected with the outer conductor of the shield cable to directly contact the metal housing.

In addition, in a case where the outer circumferential surface of a connector is covered with resin as in Patent Literature 1, an outer conductor of a shield cable is grounded by being formed in such a manner that the outer conductor of the shield cable is conductively connected to a ground wire of a connection-destination circuit board via a connector.

CITATION LIST

Patent Literature

Patent Literature 1: JP 2002-216910 A

SUMMARY OF INVENTION

Technical Problem

By covering, with the resin, the outer circumferential surface of the shield cable as in the connector disclosed in Patent Literature 1, the outer circumferential surface of the connector can be given an insulation property, and also by changing the color of the resin, it is possible to make it easier to distinguish the connection destination. However, in a case where the outer conductor of the shield cable is grounded via the ground wire of the circuit board by using such a connector, a long path length to a point at which the outer conductor is conductively connected to the metal housing, which is the point of a reference potential, is required. Accordingly, as compared with a case where the outer circumference of a connector conductively connected with an outer conductor of a shield cable is directly connected to a metal housing, the impedance has been high, causing deterioration of the shield performance.

An electrical connector according to the present disclosure has been made to solve the problem described above, and an object of the present disclosure is to provide a connector, whose outer circumferential surface is covered with resin, which minimizes the likelihood of a long path length up to a point at which an outer conductor of a shield cable is conductively connected to a metal housing.

Solution to Problem

An electrical connector according to the present disclosure includes: an inner conductor to transmit a signal; an insulator that covers an outer circumferential surface of the inner conductor; an outer conductor that covers an outer circumferential surface of the insulator and is insulated from the inner conductor by the insulator; an insulating mold that covers an outer circumferential surface of the outer conductor; and a conductor that is conductively connected with the outer conductor and penetrates the insulating mold, the conductor having a surface that is positioned outside the insulating mold and inclined toward a connection destination, wherein the outer conductor and the conductor are integrally formed.

Advantageous Effects of Invention

Since a connector according to the present disclosure whose outer circumferential surface is covered with resin has a conductive portion that penetrates a molded portion and is conductively connected with an outer conductor, it is possible to minimize the likelihood of a long path length up to a point at which the outer conductor of a shield cable is conductively connected to a metal housing.

DESCRIPTION OF EMBODIMENTS

First Embodiment

Hereinbelow, an electrical connector according to a first embodiment is explained. In the first embodiment, a case where the electrical connector is used as an intermediary connector 100 to intermediate connection between a connector and a connector is explained.

Figure 1:
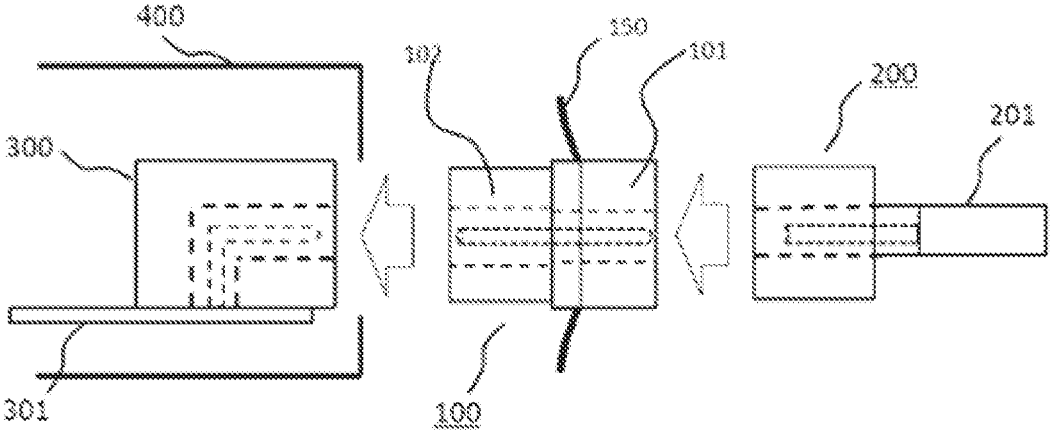
FIG. 1 is a conceptual diagram of an intermediary connector according to a first embodiment.
Figure 2:
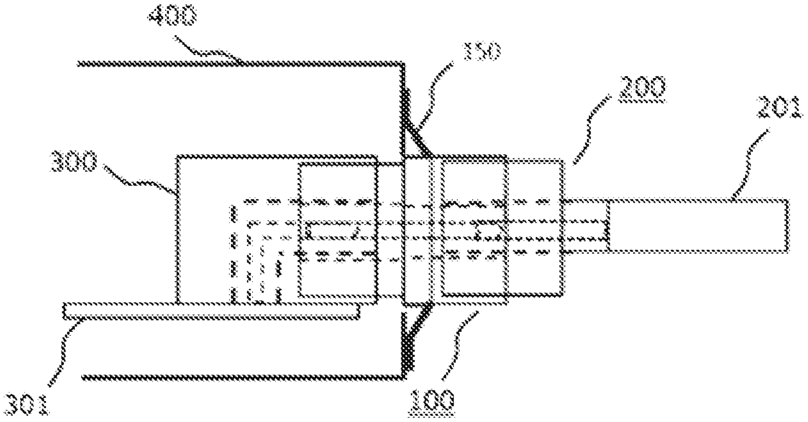
FIG. 2 is a cross-sectional view in a case where the intermediary connector according to the first embodiment is connected.

FIG. 1 is a conceptual diagram of the intermediary connector 100 according to the first embodiment. The intermediary connector 100 includes a first connector 101 and a second connector 102. The first connector 101 is connected to a shield cable connector 200 of a shield cable 201. The shield cable 201 includes an inner conductor to transmit signals, resin that covers the outer circumferential surface of the inner conductor and an outer conductor that is insulated from the inner conductor by the resin and covers the outer circumferential surface of the resin. The second connector is connected to a circuit board connector 300 mounted on a circuit board 301 housed in a metal housing 400. The circuit board 301 is fixed to the metal housing 400, and the circuit board connector 300 is fixed near a connector connection port of the metal housing 400. When the intermediary connector 100 is connected with the circuit board connector 300 mounted on the circuit board 301, a conductive portion 150 penetrating the outer circumferential surface of a molded portion 140 of the intermediary connector 100 contacts the metal housing 400, and the conductive portion 150 and the metal housing 400 are conductively connected. FIG. 2 is a cross-sectional view in a case where the respective connectors depicted in FIG. 1 are connected. By connecting the respective connectors, the conductive portion 150 has come into contact with the metal housing 400.

The intermediary connector 100 includes: an inner conductor 110 to transmit signals; an insulating portion 120 that covers the outer circumferential surface of the inner conductor 110; an outer conductor 130 that covers the outer circumferential surface of the insulating portion 120 and is insulated from the inner conductor 110 by the insulating portion 120; the insulating molded portion 140 that covers the outer circumferential surface of the outer conductor 130; and the conductive portion 150 that is conductively connected with the outer conductor and penetrates the molded portion.

The inner conductor 110 is a conductor to transmit signals. The inner conductor 110 includes: a first inner conductor 111 on a side to be connected to the shield cable connector 200; a second inner conductor 112 on a side to be connected with the circuit board connector 300; and a connecting member 113 between the first inner conductor 111 and the second inner conductor 112.

Figure 3A:
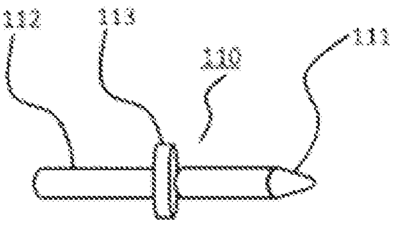
FIGS. 3A and 3B are perspective views of an inner conductor of the intermediary connector according to the first embodiment.
Figure 3B:
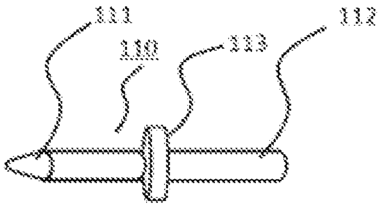

FIGS. 3A and 3B are perspective views of the inner conductor 110 of the intermediary connector 100 according to the first embodiment. FIG. 3A is a perspective view in a case where the inner conductor 110 is seen from the shield-cable side, and FIG. 3B is a perspective view in a case where the inner conductor 110 is seen from the opposite side. The first inner conductor 111 has a male structure to engage with a center conductor of the shield cable connector 200 having a female structure. When the intermediary connector 100 and the shield cable connector 200 are connected with each other, the first inner conductor 111 is electrically connected with the inner conductor of the shield cable connector 200. The second inner conductor 112 has a female structure to engage with a center conductor of the circuit board connector 300 having a male structure. When the intermediary connector 100 and the circuit board connector 300 are connected with each other, the second inner conductor 112 is electrically connected with an inner conductor of the circuit board connector 300. The first inner conductor 111 and the second inner conductor 112 are arranged coaxially, and are connected by a member having a conductive part or whose entire surface is conductive.

The connecting member 113 includes a conductive member, and is for positioning or fixation at a time when the insulating portion 120 described later is engaged. Whereas the connecting member 113 has a structure with a large diameter in the present embodiment, it may have any shape such as a protrusion or a claw as long as the insulating portion can be positioned or fixed.

The insulating portion 120 includes an insulating member that covers the outer circumferential surface of the inner conductor 110. The insulating portion 120 may be any member as long as it insulates the inner conductor 110 from the outer conductor 130 mentioned later, and may be a dielectric. In addition, the outer circumferential surface of the insulating portion 120 may have a structure to fix the outer conductor 130 mentioned later.

Figure 4A:
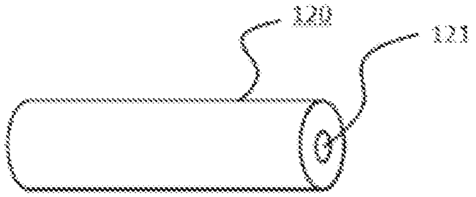
FIGS. 4A and 4B are perspective views of an insulating portion of the intermediary connector according to the first embodiment.

FIG. 4A is a perspective view of the insulating portion 120 of the intermediary connector 100 according to the first embodiment. The insulating portion 120 has a cylindrical shape having a hole 121 at its center, and the inner conductor 110 is disposed at the position of the hole 121. A structure 122 for engaging with the connecting member 113 of the inner conductor is provided at the center of the hole 121.

Figure 4B:
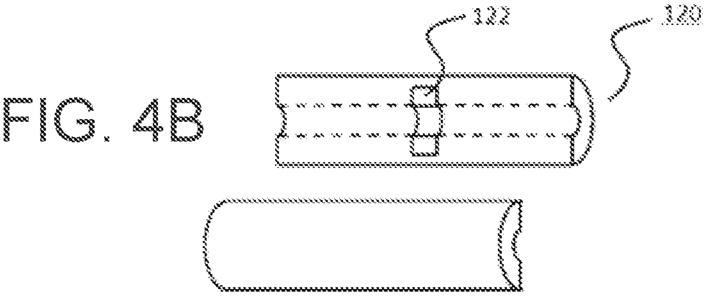

Whereas the insulating portion 120 has an integrated structure in FIG. 4A, the insulating portion 120 may include two constituent elements as depicted in FIG. 4B. As in the structure 122 depicted in FIG. 4B, for positioning or fixation of the inner conductor 110, the insulating portion 120 may have a structure in which a convexity structure and a concavity structure to mesh with the connecting member 113 of the inner conductor 110 are provided in the hole 121 of the insulating portion 120.

The outer conductor 130 covers the outer circumferential surface of the insulating portion 120, is insulated from the inner conductor 110 by the insulating portion 120 and includes a conductor. The outer conductor 130 includes a first outer conductor 131 on a side to be connected with the shield cable connector 200, and a second outer conductor 132 on a side to be connected with the circuit board connector 300. When the intermediary connector 100 and the shield cable connector 200 are connected with each other, the first outer conductor 131 is electrically connected with the outer conductor of the shield cable connector 200. When the intermediary connector 100 and the circuit board connector 300 are connected with each other, the second outer conductor 132 is electrically connected with an outer conductor of the circuit board connector 300.

Figure 5A:
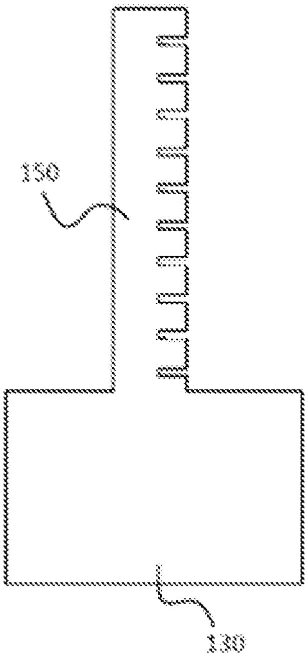
FIGS. 5A and 5B are conceptual diagrams of an outer conductor and a conductive portion of the intermediary connector according to the first embodiment.
Figure 5B:
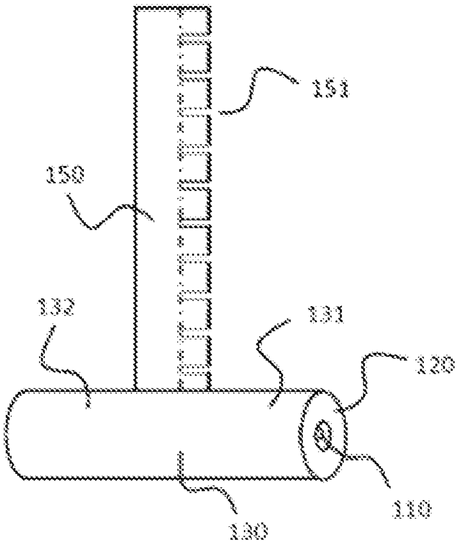
Figure 6A:
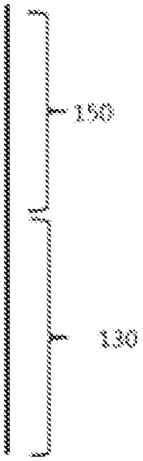
FIGS. 6A, 6B, and 6C are conceptual diagrams in a case where the outer conductor and the conductive portion of the intermediary connector according to the first embodiment are seen in a direction perpendicular to the axis.
Figure 6B:
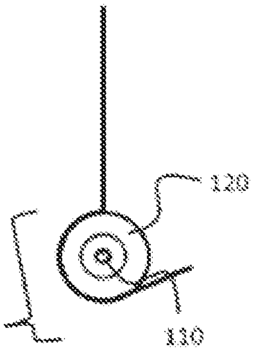
Figure 6C:
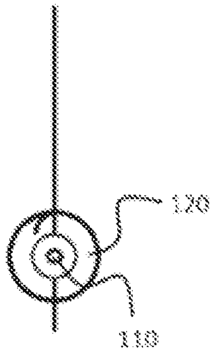

FIG. 5A is an unfolded drawing of the outer conductor 130 and the conductive portion 150 of the intermediary connector 100 according to the first embodiment. As depicted in FIG. 5A, the outer conductor 130 has a rectangular shape to be wound around the outer circumferential surface of the insulating portion 120, and the conductive portion 150 mentioned later is formed integrally with the outer conductor 130 perpendicularly to its axis. FIGS. 6A, 6B, and 6C are conceptual diagrams of the outer conductor 130 and the insulating portion 120 when seen in a direction perpendicular to the axis, and the outer conductor 130 is wound around the insulating portion 120 as depicted by FIG. 6A, FIG. 6B and FIG. 6C in this order. Note that as depicted in FIG. 6C, the outer conductor 130 may be wound around the insulating portion 120 in such a manner that a part of the outer conductor 130 overlaps another part thereof to achieve mutual conduction between the overlapping parts. Another method may be adopted to achieve conduction. FIG. 5B is a perspective view when the outer conductor 130 is wound around the insulating portion 120.

Figure 7:
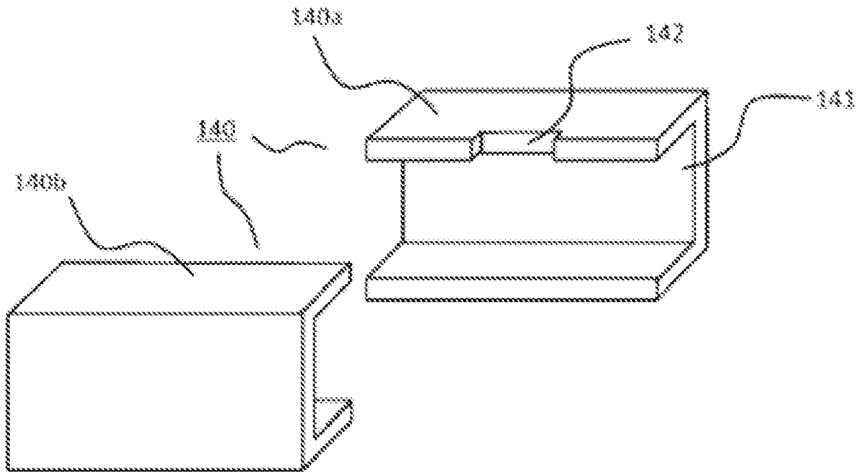
FIG. 7 is a perspective view of a molded portion of the intermediary connector according to the first embodiment.
Figure 8:
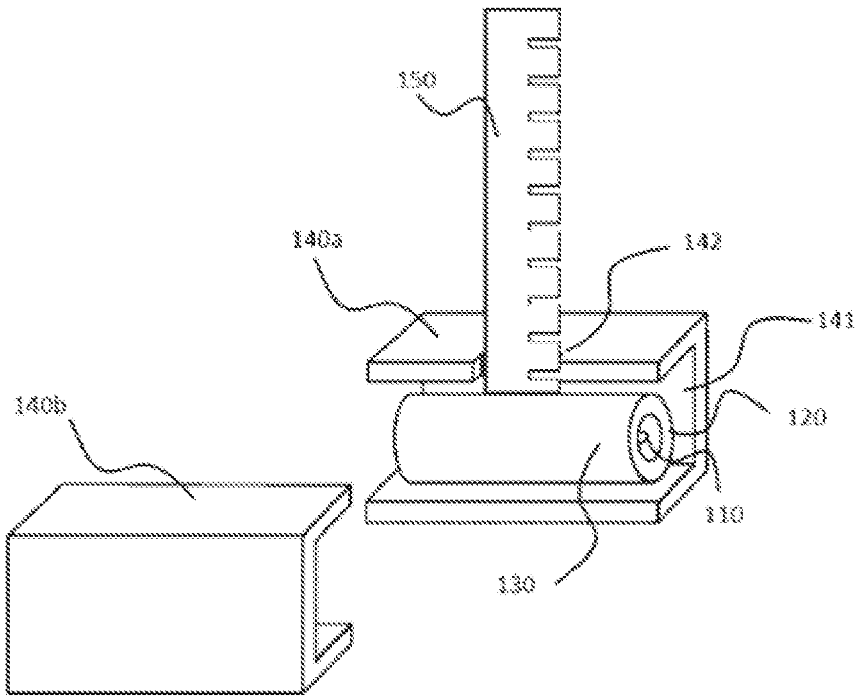
FIG. 8 is a perspective view in a case where the outer conductor is disposed between members of the molded portion of the intermediary connector according to the first embodiment.
Figure 9:
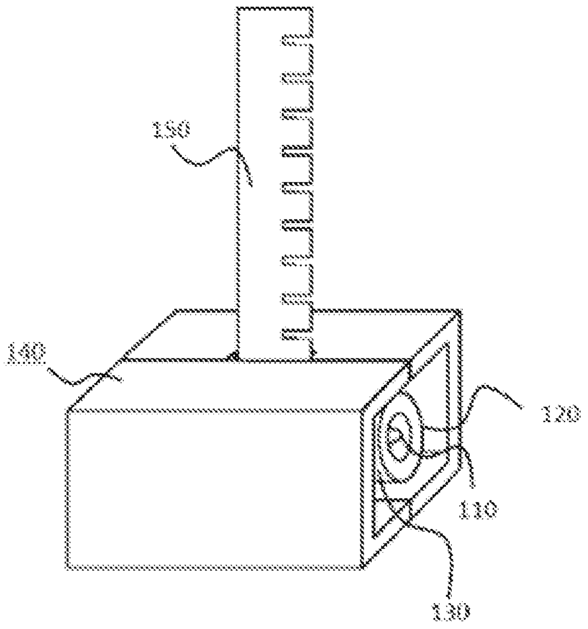
FIG. 9 is a perspective view in a case where the outer conductor is housed in the molded portion of the intermediary connector according to the first embodiment.

The molded portion 140 is an insulating resin that covers the outer circumferential surface of the outer conductor 130. FIG. 7 is a perspective view of the molded portion 140 of the intermediary connector 100 according to the first embodiment. The molded portion 140 is a structure that includes two members 140*a* and 140*b* in such a manner that the outer conductor 130 can be incorporated therein, and has a hole 141 in the axial direction in a state where the two members 140*a* and 140*b* are combined with each other. In addition, the molded portion 140 has a penetrating portion 142 for allowing the conductive portion 150 formed integrally with the outer conductor 130 to penetrate therethrough. FIG. 8 is a perspective view in a case where the outer conductor 130 is disposed between the members of the molded portion 140, and FIG. 9 is a perspective view in a case where the outer conductor 130 is housed in the molded portion 140. By causing the conductive portion 150 formed integrally with the outer conductor 130 to penetrate through the penetrating portion 142 of the molded portion 140 in this manner, the outer conductor 130 can be fixed to the molded portion 140. Note that whereas the penetrating portion 142 is formed by providing a groove to the constituent member 140*a* of the molded portion 140 in FIG. 7, it may be provided in any manner as long as it is provided in such a manner that the conductive portion 150 can penetrate the outer circumferential surface of the molded portion 140 from the outer conductor 130 positioned inside the molded portion 140.

In addition, when the two members 140*a* and 140*b* of the molded portion 140 engage with each other, concavity/convexity structures or claw structures for positioning or fixation may be provided on the engagement surfaces or front surfaces of the two members 140*a* and 140*b*.

The molded portion 140 is colored, and molded portions with the same color are used also for the connection-destination shield cable connector 200 and circuit board connector 300. Thereby, it is possible to prevent an operator from engaging a wrong pair of connectors with each other when the operator connects the respective connectors. In addition, waterproof and dustproof functions also are provided by covering the outer circumferential surface of the outer conductor 130 with the molded portion 140.

Figure 10:
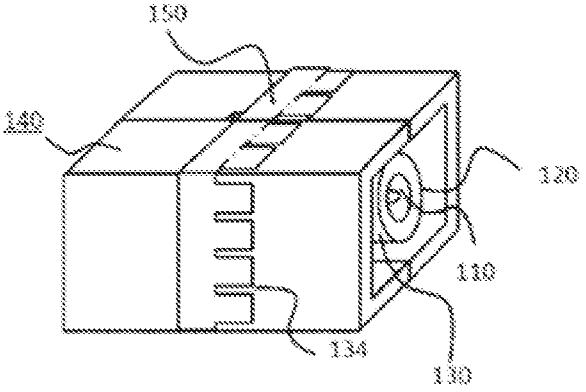
FIG. 10 is a perspective view in a case where the conductive portion is wound around the outer circumferential surface of the molded portion of the intermediary connector according to the first embodiment.
Figure 11:
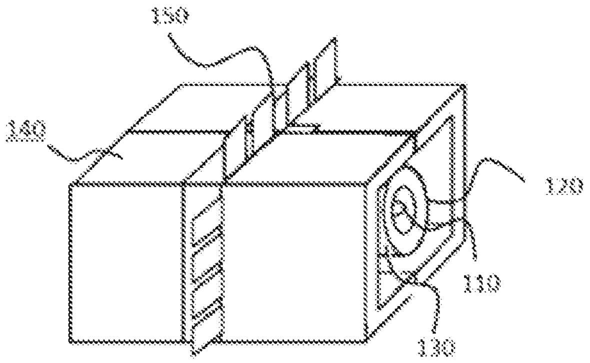
FIG. 11 is a perspective view in a case where slitted portions of the conductive portion of intermediary connector according to the first embodiment are bent to stand up perpendicularly to the axis.

The conductive portion 150 is conductively connected with the outer conductor 130, penetrates from the inner side to the outer side of the molded portion 140 and is formed integrally with the outer conductor 130 by using a conductive member. The conductive portion 150 is provided with a plurality of slits 151 in parallel with the axis. As depicted in FIG. 10, the conductive portion 150 is wound and disposed around the outer circumference of the molded portion 140. Then, as depicted in FIG. 11, the side of the conductive portion 150 on which the slits 151 are provided is bent to stand up perpendicularly to the axis.

Since the conductive portion 150 conductively connected with the outer conductor 130 is present on the outer circumference of the molded portion 140 in this manner, the conductive portion 150 can be caused to contact the metal housing 400 when the intermediary connector 100 is connected to the circuit board connector 300 provided in the metal housing 400, thereby achieving conduction bypassing a ground wire of the circuit board 301.

As mentioned above, since the electrical connector according to the present disclosure whose outer circumferential surface is covered with resin has the conductive portion that penetrates the molded portion and is conductively connected with the outer conductor, it is possible to minimize the likelihood of a long path length up to a point at which the outer conductor of the shield cable is conductively connected to the metal housing.

Furthermore, since the conductive portion 150 has a surface perpendicular to the axis, the conductive portion 150 can easily contact the outer side surface of the metal housing 400 when the intermediary connector 100 is connected to the circuit board connector 300. In addition, by forming the surface of the conductive portion 150 positioned outside the molded portion 140 as a surface that is inclined toward the metal housing 400 of the connection-destination circuit board connector 300 as depicted in FIG. 1 and FIG. 2, a structure that allows the conductive portion 150 to more easily contact the outer side surface of the metal housing 400 can be formed. Note that a function like a spring can also be given to the conductive portion 150 by bending the surface of the conductive portion 150 positioned outside the molded portion 140 multiple times or bending the surface of the conductive portion 150 into an arc shape.

In addition, by inclining the surface of the conductive portion 150 positioned outside the molded portion 140 toward the metal housing 400 of the connection-destination circuit board connector 300, and furthermore bending the surface of the conductive portion 150 into a V-shape, conduction can be achieved by causing the surface of the conductive portion 150 to contact the inner side surface of the metal housing 400 when the intermediary connector 100 is connected to the circuit board connector 300. Note that also in a case where the surface of the conductive portion 150 is caused to contact the inner side of the metal housing 400, a function like a spring can also be given to the conductive portion 150 by bending the conductive portion 150 multiple times or bending the conductive portion 150 into an arc shape.

Figure 12B:
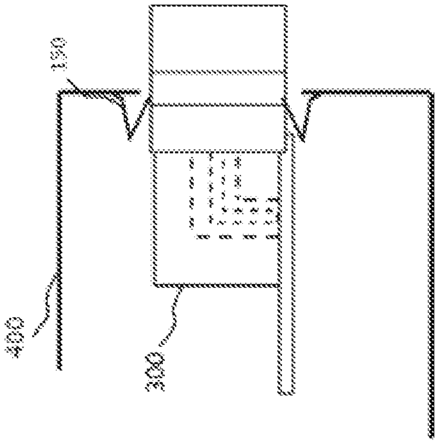
FIGS. 12A and 12B are conceptual diagrams in a case where the conductive portion of the intermediary connector according to the first embodiment contacts the inner side of a metal housing.
Figure 12A:
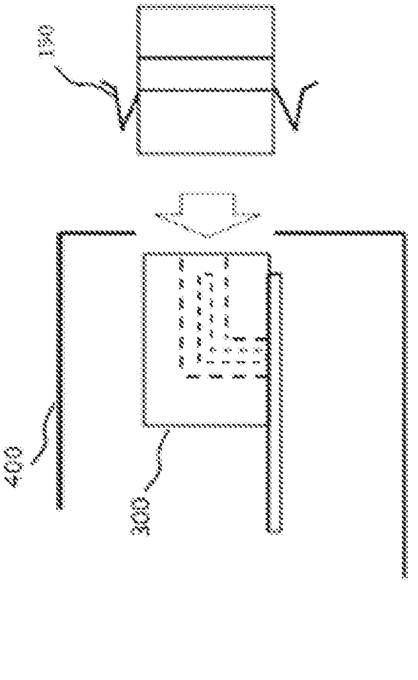

Note that whereas the conductive portion 150 is bent to stand up as depicted in FIG. 11 in the present embodiment, the shape of the conductive portion 150 is not limited to this, but may be any shape as long as the conductive portion 150 and the metal housing 400 come into contact with each other when the intermediary connector 100 is connected with and fixed to the circuit board connector 300. For example, the shape of the conductive portion 150 may be those depicted in FIGS. 12A and 12B.

In addition, the electrical connector is not limited to the intermediary connector 100 in the first embodiment, but the electrical connector according to the present disclosure may be any electrical connector as long as its conductive portion comes into contact with and fixed to a metal housing when the electrical connector is connected to a connector fixed to the metal housing.

In addition, whereas regarding the first inner conductor 111 and the second inner conductor 112 of the inner conductor 110, the first inner conductor 111 has the female structure, and the second inner conductor 112 has the male structure in the first embodiment, the inner conductor 110 may have a structure which is reversed in terms of the female structure and the male structure or may have a structure with male structures or with female structures, as long as the structure can fit to connection-destination connectors.

Figure 13:
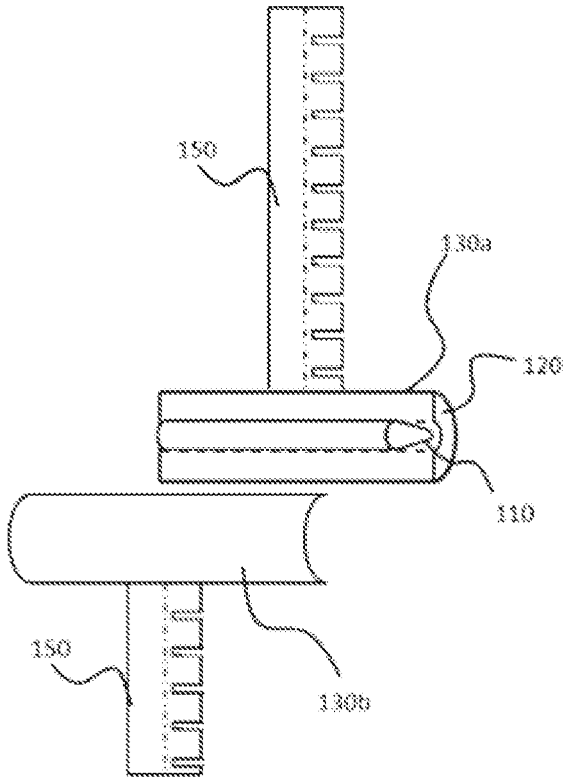
FIG. 13 is a conceptual diagram of the outer conductor and the conductive portion of the intermediary connector according to the first embodiment.
Figure 14:
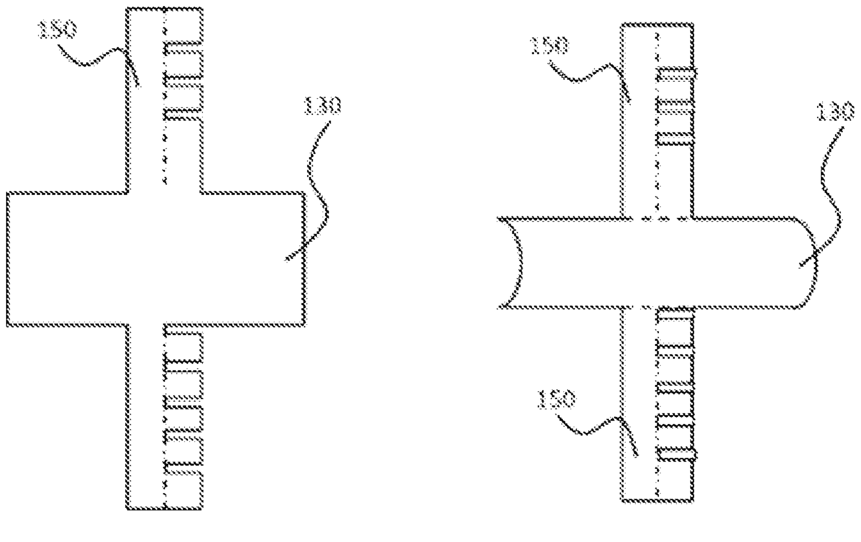
FIG. 14 is a conceptual diagram of the outer conductor and the conductive portion of the intermediary connector according to the first embodiment.
Figure 15:
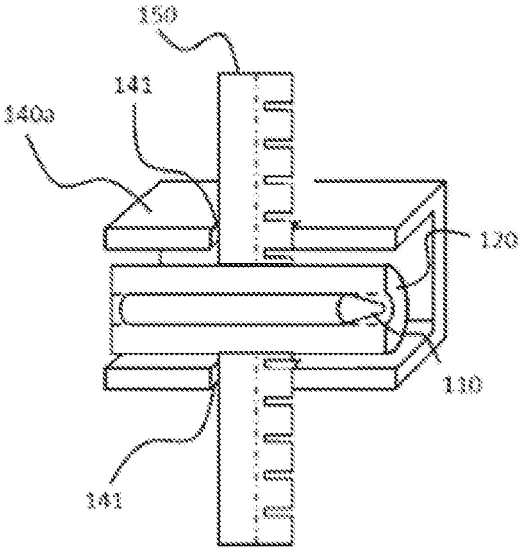
FIG. 15 is a perspective view in a case where the outer conductor is housed in the molded portion of the intermediary connector according to the first embodiment.

In addition, regarding the outer conductor 130 and the conductive portion 150, the outer conductor 130 may include two structures 130*a* and 130*b* as depicted in FIG. 13. Alternatively, two structures may be used, each provided with the outer conductor 130 to cover a half of the circumference of the insulating portion 120, and provided with the conductive portion 150 on its upper and lower sides as depicted in FIG. 14. In a case where there are conductive portions 150 at a plurality of locations in these manners, it is sufficient if the conductive portions 150 are allowed to penetrate the outer circumferential surface of the molded portion 140 by providing holes 141 through the member 140*a* of the molded portion 140 at two upper and lower locations as depicted in FIG. 15, for example. The structures of the outer conductor 130 and the conductive portion 150 are not limited to those described above, and it is sufficient if the outer conductor 130 covers the outer circumferential surface of the inner conductor 110, and the conductive portion 150 is conductively connected with the outer conductor 130 and penetrates the outer circumferential surface of the molded portion 140. The number of the slits 151 of the conductive portion 150 may be or may not be more than one.

REFERENCE SIGNS LIST

100: intermediary connector, 101: first connector, 102: second connector, 110: inner conductor, 111: first inner conductor, 112: second inner conductor, 113: connecting member, 120: insulating portion, 121: hole, 122: structure, 130: outer conductor, 131: first outer conductor, 132: second outer conductor, 140, 140*a*, 140*b*: molded portion, 141: hole, 142: penetrating portion, 150: conductive portion, 151: slit, 200: shield cable connector, 201: shield cable, 300: circuit board connector, 301: circuit board, 400: metal housing

The invention claimed is:

1. An electrical connector comprising:

an inner conductor to transmit a signal;

an insulator that covers an outer circumferential surface of the inner conductor;

an outer conductor that covers an outer circumferential surface of the insulator and is insulated from the inner conductor by the insulator;

an insulating mold that covers an outer circumferential surface of the outer conductor; and a conductor that is conductively connected with the outer conductor and penetrates the insulating mold, the conductor having a surface that is positioned outside the insulating mold and inclined toward a connection destination, wherein the outer conductor and the conductor are integrally formed, the conductor comprises a plurality of slits extending from an intermediate portion of the conductor to an edge of the conductor, and the plurality of slits of the conductor extends parallel to a longitudinal axis of the electrical connector.

2. The electrical connector according to claim 1, wherein the conductor is formed in a spring shape.

* * * * *